UNITED STATES PATENT OFFICE.

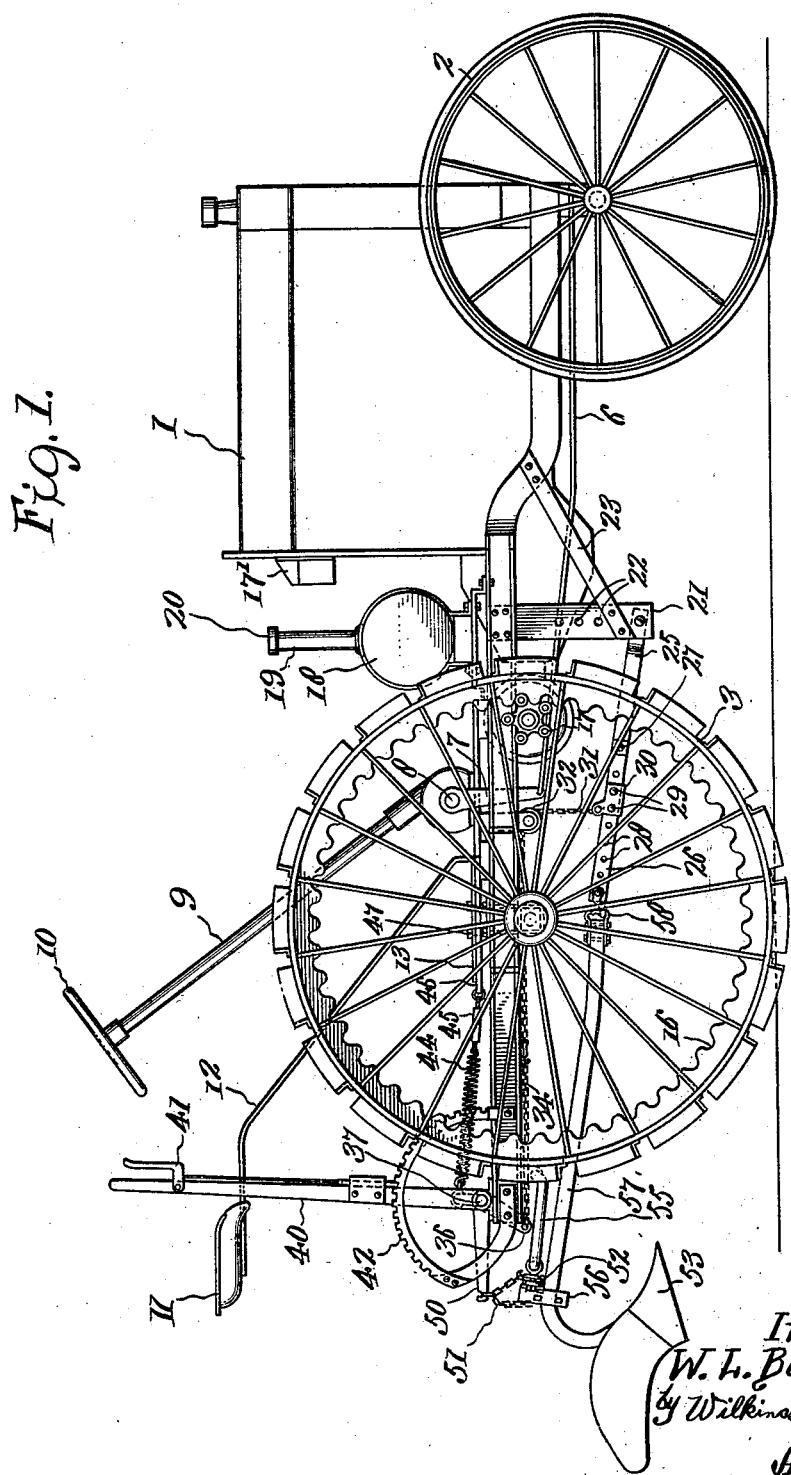

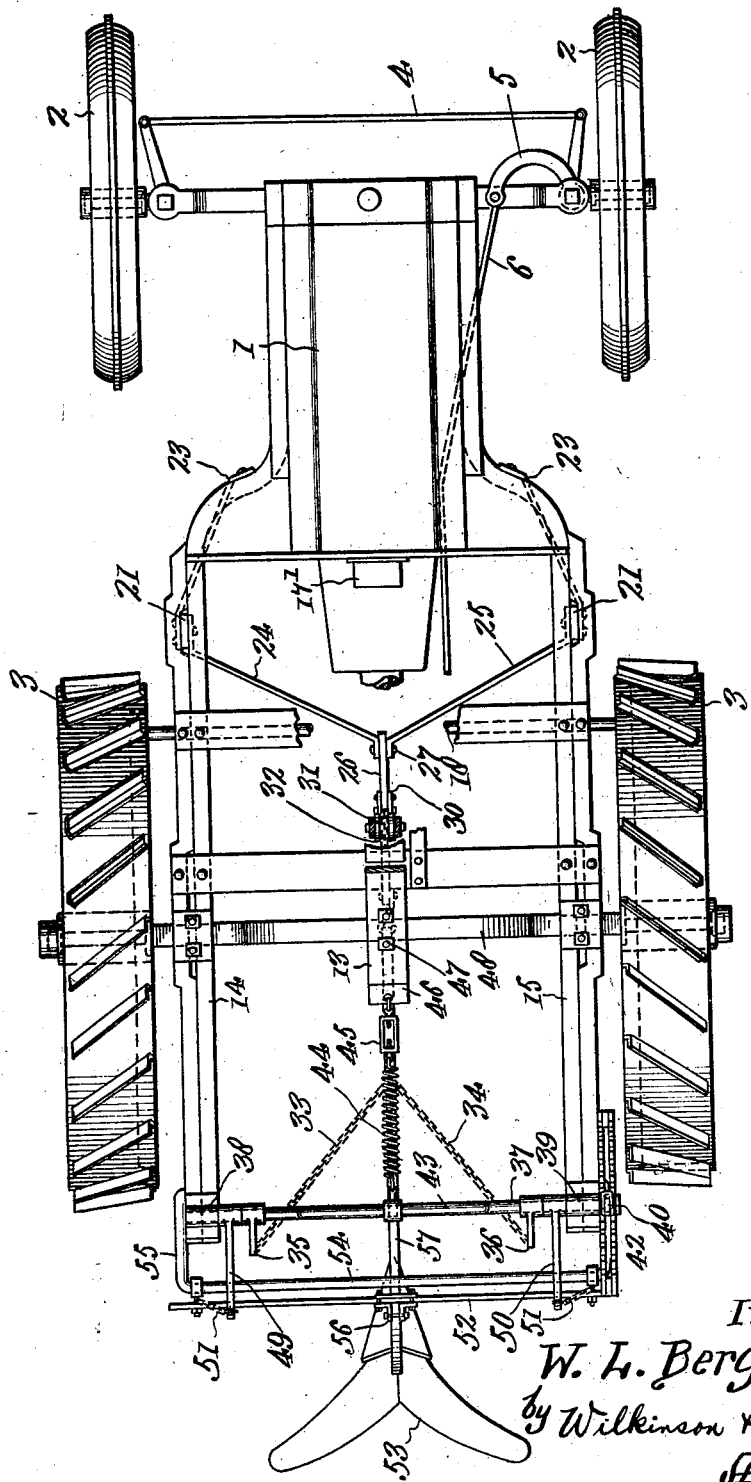

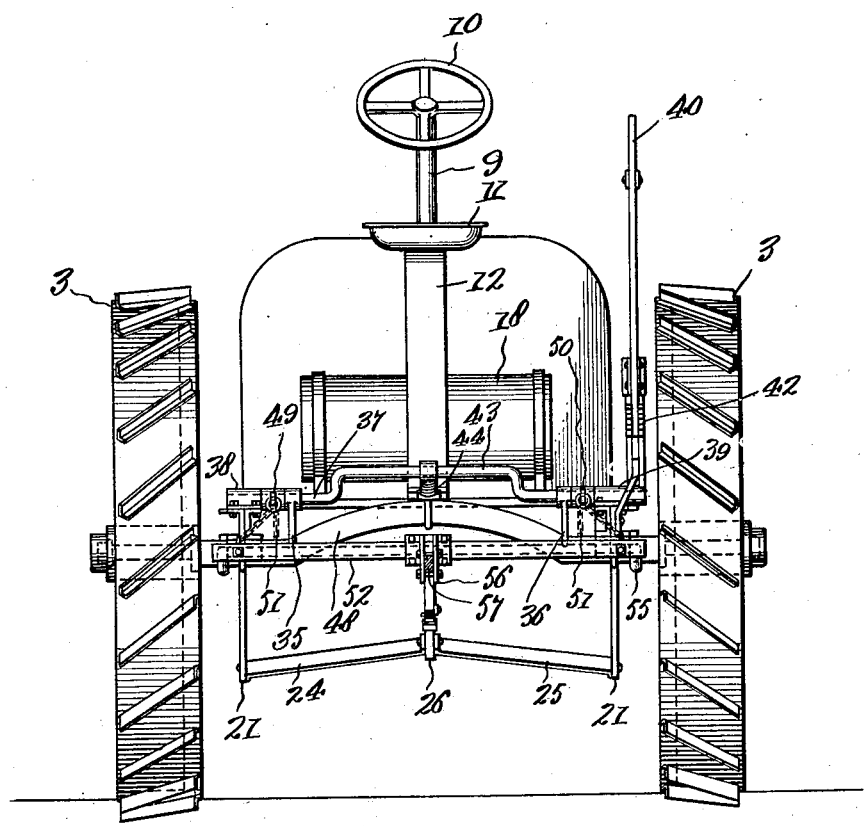

WALTER L. BERGERON, OF BOUTTE, LOUISIANA.

IMPLEMENT ATTACHMENT FOR TRACTORS.

1,369,606.  Specification of Letters Patent.  Patented Feb. 22, 1921.

Application filed August 4, 1920. Serial No. 401,231.

*To all whom it may concern:*

Be it known that I, WALTER L. BERGERON, a citizen of the United States, residing at Boutte, in the parish of St. Charles and State of Louisiana, have invented certain new and useful Improvements in Implement Attachments for Tractors; and I do hereby declare the following to be a full, clear, and exact description of the invention, such as will enable others skilled in the art to which it appertains to make and use the same.

The present invention relates to improvements in implement attachments for tractors, and has for an object to provide an improved tractor having an attachment thereon for receiving one or more plows or like agricultural implements, with devices to raise and lower such plows and to adjust the depth to which the same may enter the soil.

It is another object of the present invention to so alter the construction of a tractor as to compactly receive the plows and adjusting devices so that the same will not extend appreciably beyond the rear of the tractor but will form a closely grouped mechanism capable of being turned in a short space and under quick and easy control.

In the accompanying drawings forming a part of this application, and in which similar reference symbols indicate corresponding parts in the several views:

Figure 1 is a side view of an improved tractor constructed in accordance with the present invention;

Fig. 2 is a plan view thereof with certain parts broken away; and

Fig. 3 is a rear view with the plow removed.

Referring more particularly to the drawings, 1 designates generally a tractor having the front steering wheels 2 and the rear driving and traction wheels 3. The steering wheels are connected together by a bar 4 to be simultaneously turned, and in the usual manner there is a curved arm 5 associated with one of the wheels which is coupled to a link 6 extending rearwardly beneath the tractor and coupled to an arm 7 depending from a shaft 8 which forms part of the steering mechanism and is journaled at the base of the steering column or post 9.

The usual steering control wheel 10 is mounted on the post 9 in a position where it may be conveniently turned by the operator occupying the seat 11. The seat 11 is mounted on a flat spring support 12 extending forwardly and downwardly and having its lower end returned upon itself, as indicated at 13, and being secured in any suitable manner to an appropriate part of the framework of the tractor.

This framework generally consists of longitudinal channel beams 14 and 15 which are bent into close parallel relation at their front ends to receive the motor which drives the rear wheels 3 through appropriate mechanism. In this instance the drive wheels are shown as provided with internal gears 16 meshing with pinions 17 on a shaft 18. The shaft 18 is coupled in the usual manner to the drive shaft as through a differential, which forms no part of the invention and is therefore broken away.

It will also be understood that the various clutch and brake pedals, and other mechanism essential to the control of the motor and its relation with the driving wheels, are all mounted in convenient portions of the framework of the machine, and are all disposed with reference to the seat 11 so that they may be conveniently operated by the driver.

Furthermore, the spark and gas control levers are mounted on the steering wheel 10, but as all of these parts involve no portion of the present invention and constitute standard apparatus, they have been omitted from the illustration.

The coil box is shown at 17' and the gasolene tank at 18, the latter having a filling neck 19 extending upwardly to a convenient point and inclosed by a removable cap 20. If desired, a cover or shield may be placed over the coil box and gasolene tank, but this is not essential. Also mud guards may be provided for the traction wheels 3.

Hangers 21 depend from the framework at an intermediate point thereon provided with a series of vertically disposed perforations 22, and are braced at their lower ends by bars 23 which are riveted or otherwise secured to portions of the framework. The lower ends of the hangers 21 receive the divergent ends of a pair of supporting bars 24 and 25 having their inner portions, which lie substantially at the longitudinal center of the machine, turned parallel to one another and being spaced apart to receive the forward end of a link 26, a pivot 27 being employed to hold the link in such ends of the bars 24 and 25. The link is furnished with a series of perforations 28 to receive the pins or bolts 29 on a sleeve 30 slidable thereon.

A chain 31 connects at its lower end to the sleeve 30 and passes upwardly over a pulley 32 depending from the framework. From the pulley 32 the chain runs horizontally and rearwardly to a suitable point where it connects with diverging branch chains 33 and 34 running to arms 35 and 36 depending from a rock shaft 37 which is journaled in appropriate bearings 38 and 39 on the channel beams 14 and 15.

The rock shaft is mounted substantially at the end of the framework, and is operated by a lever 40 placed conveniently to the seat 11 and equipped with a latch device 41 which coöperates with a toothed segment 42 also supported by one of the channel beams.

The central portion of the shaft 37 is arched upwardly, as indicated at 43, and forms a convenient point to which one end of a coil spring 44 may be attached. The other end of the spring 44 is coupled to a turn buckle 45 for purposes of adjustment, and the turn buckle is secured to a plate 46 which is secured as by a U-bolt 47 to an appropriate part of the framework, for instance the axle 48 on which the drive wheels 3 are mounted.

The rock shaft 37 also carries another pair of arms 49 and 50 which extend substantially rearwardly at an acute angle to the arms 35 and 36 and lie outwardly thereof.

Chains 51 connect the outer ends of the arms 49 and 50 with a bar 52 which forms a point of support for the plow; this plow is indicated at 53 and as illustrated is a double plow mounted in the center of the machine. It will, of course, be understood that plows in greater numbers may be employed and of any suitable type, they being connected at convenient points to the bar 52. The bar 52 has a swinging movement together with a rod 54 which has arms 55 journaled at their forward ends in the framework.

Hangers or stirrups 56 pass about the plow beam 57 and join with the bar 52 so as to support the plow. The usual clevis 58 is connected between the forward end of the plow beam 57 and the link 26.

In operation, the motor drives the rear traction wheels which are provided with any suitable studs or traction elements, this driving being accomplished through the pinions 17 and the internal gears 16 of the wheels 3. The tractor is controlled by the operator from the seat 11 in the usual manner.

In Fig. 1 the plow 53 is shown to be elevated, this being accomplished by swinging the lever 40 forwardly to the position shown. The latch 41 is engaged with one of the notches in the segment 42, and in this condition the plow will be held elevated until the field is reached and the operation of plowing is about to begin. The lever 40 is thereupon swung rearwardly after disengaging the latch, and this is followed by the turning of the rock shaft 37 in a counterclockwise direction, thus correspondingly swinging the various arms carried thereby. The arms 49 and 50 will be thus lowered, permitting the plow 53 to descend into contact with the soil, and its depth may be also more or less regulated in this way.

The arms 35 and 36 will be swung forwardly, thus releasing the chain 31 and allowing the link 26 together with the forward end of the plow beam 57 to also descend. The action will therefore operate to lower both the rear and front ends of the plow beam 57 simultaneously so as to not only bring the plow 53 into contact with the soil but to also regulate its pitch or position therein. The latter may be changed as required, by removing the pins 29 and shifting the sleeve 30 along the link 26 after which the pins may be re-inserted in the newly presented perforations 28.

A further adjustment may be had by engaging the bars 24 and 25 with other of the perforations 22 in the hangers 21.

In these several ways the angle at which the point of the plow 53 will operate can be controlled through wide limits; the spring 44 acts as a counterbalance, being put under a condition of tension when the lever 40 is swung to the rear position; or, in other words, when the plow 53 is allowed to descend together with the other weighty parts connected thereto. Consequently when these parts are to be restored to an upper position, the spring will assist in the raising operation so as to take off of the operator a great part of this weight, thus making the movement of the devices easy and convenient.

It will be appreciated that the improvements are such as to enable them to be installed on a tractor of any suitable type without any appreciable alteration in the construction thereof; and even allowing a motor vehicle of other character to be converted into a tractor for use with the invention.

It is obvious that those skilled in the art may vary the details of construction and arrangements of parts without departing from the spirit of my invention, and therefore I do not wish to be limited to such features except as may be required by the claims.

I claim:

1. In combination with a vehicle, of a beam and a ground working implement carried thereby, a rock shaft journaled near the rear end of said frame and extending transversely across the same, arms extending rearwardly from said rock shaft and being movable therewith, a bar extending crosswise of the frame beyond the rear end thereof, flexible connections between said arms and bar, means whereby said bar is attached to the beam, other arms extending downwardly from said rock shaft, flexible connections coupled to said last mentioned arms and extending forwardly of the frame, a flexible connection joining the forward ends of said last named connections, guide means depending from the frame for receiving said last mentioned flexible connection and directing the same downwardly, a link connected to the forward end of the beam and extending forwardly, a collar slidable on said link and being connected to said flexible connection, means for securing said collar in any position of adjustment on said link, braces connected to the forward end of said link, means for adjustably holding the forward ends of said braces, means for swinging said rock shaft and for holding the same in an adjustable position, and counter-balance means coupled to said rock shaft, substantially as described.

2. In combination with a wheeled frame, of a rock shaft extending transversely thereacross near its rear end, hand actuated means for oscillating said rock shaft, pairs of arms extending rearwardly and downwardly from said rock shaft, a counter-balance connected to said rock shaft, flexible means connected to the downwardly extending arms, said flexible means extending forwardly of the vehicle, guide means for said flexible means depending from the vehicle and adapted to direct said flexible means downwardly therefrom, a sleeve having perforations connected to the downwardly directed end of said flexible means, a perforated link slidably receiving said sleeve and adapted to hold the former in adjustable position, braces connecting the forward end of said link, means for adjustably mounting the forward ends of the braces, a plow beam connected at its forward end to the rear end of said link, a plow share carried by said beam, a bar extending transversely of the frame and having swinging movement thereabout, said bar being connected to said plow beam, and flexible connections between the rearwardly extending arms and said bar, substantially as described.

3. In combination with a wheeled frame, a shaft extending transversely across the rear end of the frame, a lever for actuating said shaft having latch means associated therewith, counter-balance means acting on said rock shaft, arms extending rearwardly and downwardly from said rock shaft, a bar mounted to swing about the rear portion of the frame work, flexible connections between the rearwardly extending arms and said bar, a plow beam connected to said bar, a link connected to the forward end of said plow beam and extending beneath the vehicle, a sleeve sliding on said link, means for adjustably holding the sleeve in place thereon, flexible means connecting said sleeve with the downwardly extending arms, a pair of braces having their rear ends connected to the forward end of said link and diverging forwardly, a pair of stirrups depending from the frame intermediate the ends thereof, and means for adjustably securing the forward ends of said braces to said stirrups, substantially as described.

WALTER L. BERGERON.